United States Patent [19]

Baskent et al.

[11] 4,380,591

[45] Apr. 19, 1983

[54] NOVEL AMINO CATALYST MIXTURE FOR STABILIZATION OF POLYURETHANE FOAM

[75] Inventors: Feyyaz O. Baskent, Mahopac; Michael R. Sandner, Chappaqua, both of N.Y.

[73] Assignee: Union Carbide Corporation, Danbury, Conn.

[21] Appl. No.: 345,393

[22] Filed: Feb. 3, 1982

[51] Int. Cl.$^3$ .................... C08G 18/14; C08G 18/42; C08G 18/18; C08G 18/20
[52] U.S. Cl. ................................. 521/115; 521/118; 521/904; 521/131; 521/160; 564/503
[58] Field of Search .................. 521/115, 118, 904

[56] References Cited

U.S. PATENT DOCUMENTS

| | | | |
|---|---|---|---|
| 3,424,701 | 1/1969 | Kujawa | 521/115 |
| 3,476,933 | 11/1969 | Mendelsohn | 260/2.5 |
| 3,520,835 | 7/1970 | Chandley et al. | 521/118 |
| 3,925,268 | 12/1975 | Rosemund et al. | 260/2.5 AC |
| 4,119,582 | 10/1978 | Matsubara et al. | 521/904 |
| 4,214,055 | 7/1980 | Seefried et al. | 521/904 |

FOREIGN PATENT DOCUMENTS

1166742 10/1969 United Kingdom .

*Primary Examiner*—H. S. Cockeram
*Attorney, Agent, or Firm*—Paul W. Leuzzi, II

[57] ABSTRACT

Amino catalyst mixtures containing from 10 to 95 percent by weight of 2-diisopropylamino ethanol and from 5 to 90 percent by weight of an amine or mixture of amines selected from the group described herein has been found to be a replacement for N-ethylmorpholine in the production of polyurethane foams.

13 Claims, No Drawings

NOVEL AMINO CATALYST MIXTURE FOR STABILIZATION OF POLYURETHANE FOAM

BACKGROUND OF THE INVENTION

This invention relates to novel mixtures of amines as catalysts for the formation of urethane cellular products, particularly polyester urethane foams.

It is well known that the urethane linkages of urethane foams are formed by the exothermic reaction of a polyfunctional isocyanate and a polyfunctional active hydrogen-containing compound in the presence of a catalyst, and that the cellular structure of the foam is provided by gas evolution and expansion during the urethane-forming reaction. From the standpoint of their chemical structure, urethanes are usually classified as polyether or polyester urethanes, depending on the type of polyol employed. Urethane foams also differ with respect to their physical structure and, from this standpoint, are generally classified as flexible, semi-flexible or rigid foams.

It is also known that a number of different chemical reactions occur during polymer formation and expansion. For example, in addition to the chain-extending, urethane-forming reaction between free isocyanate groups and active hydrogen, initially formed urethane linkages bearing secondary hydrogen may alo function as a source of active hydrogen and react with additional isocyanate to form cross-links between polymer chains. Further, in water-containing systems such as those employed for the manufacture of flexible foams, isocyanate is also consumed by reaction with water, thereby generating carbon dioxide as an in situ blowing agent and introducing urea groups. These reactions, their relative rates and the point in time at which they occur influence the nature of the cellular structure and the physical and mechanical properties of the foam produced. Although balancing these variables so as to achieve a particular type or grade of foam can be controlled to some extent by the functionality, molecular weight and other structural features of the reactants, the catalyst system also plays a significant role in this respect. Among the relatively few compounds that have achieved widespread commercial application as catalysts in polyurethane manufacture are the tertiary amines consisting of carbon, hydrogen and nitrogen and those consisting of carbon, hydrogen, nitrogen and oxygen. N,N-Dimethyl ethanolamine is commonly employed by those skilled in the art as a catalyst for the preparation of polyurethane foam. 2-(2-Dimethyl-aminoethoxy)ethanol has been mentioned as a catalyst for polyurethane coatings in British Pat. No. 1,166,742. 3-Dimethylaminopropionitrile was reported as a catalyst for polyurethane foams in U.S. Pat. No. 3,925,268. N-Ethylmorpholine is a major component in the mixed catalyst systems for high-resilience foams. N,N,N,N-Tetramethyl-1,3-butane-diamine is another known catalyst for urethane foams.

With respect to flexible polyurethane foam manufacture generally, it is often the preferred practice of foam manufactures to premix the catalyst, water and foam stabilizes and to feed the aqueous premixture, commonly referred to as the activator stream, to the foam formulation as a single stream. It is often observed that the mere mixing of the catalyst and the foam stabilizing components in water forms a highly viscous mixture which detracts from the processing advantage of adding these components as a combined stream rather than as individual streams. This problem is encountered in particular in the manufacture of polyester polyol-based polyurethanes in which silicon-free organic surfactants are employed. Thus, when certain catalysts, such as bis-[2-(N,N-dimethylamino)ethyl]ether, are present in combination with organic foam stabilizers, the activator stream becomes extremely viscous, approaching or actually undergoing gellation. This problem is often resolved by the use of N-ethylmorpholine as the catalyst.

The usefulness of N-ethylmorpholine in the manufacture of cellular urethanes is, however, attended with certain disadvantages. Thus, N-ethylmorpholine suffers most from having a particularly strong amine odor. The large quantities of N-ethylmorpholine which are employed relative to other catalyst components of the foam formulation causes an obnoxious atmosphere at and surrounding the foam manufacturing plant site. Also, foams prepared with N-ethylmorpholine have a strong residual amino odor. Finally, N-ethylmorpholine has been associated with a number of toxic effects as reported in Plastic Technology, "Catalysts Improve As Their Need Increases", pages 47–49 (July 1972). Consequently, it is desirable and a primary object of this invention to provide a novel catalyst replacement for N-ethylmorpholine in the production of cellular polyurethane foams. Furthermore, the novel catalyst should have sufficient pre-mix activator stability and mix viscosity to compare favorably with existing commercial systems. Various other objects and advantages of the present invention will become apparent from the accompanying description and disclosure.

SUMMARY OF THE INVENTION

The present invention provides a novel method for producing a polyurethane foam. This novel method comprises reacting (a) an organic polyisocyanate and (b) an organic compound containing at least two active hydrogen atoms, in the presence of a blowing agent and an amino catalyst mixture and foaming the product, wherein the amine catalyst mixture comprises from about 10 to 95 percent by weight of 2-diisopropylamino ethanol and from 5 to 90 weight percent of an amine or a mixture of amines selected from the group consisting of amines of the generic formula:

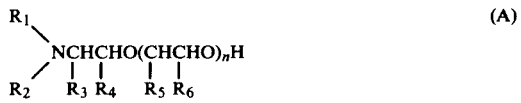

(A)

wherein $R_1$ and $R_2$ are individually selected from the group consisting of alkyl groups containing from one to four carbon atoms inclusive and alkyloxy groups of the formula:

wherein $R_7$ and $R_8$ are individually hydrogen or alkyl groups containing one to four carbon atoms; $R_3$, $R_4$, $R_5$ and $R_6$ are individually selected from the groups consisting of hydrogen and alkyl groups containing from one to four carbon atoms inclusive and n is an integer having a value of from 0 to 4 units;

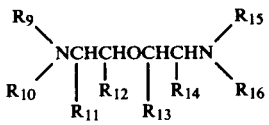

(B)

wherein $R_9$, $R_{10}$ $R_{15}$ and $R_{16}$ are individually of the same significance as $R_1$ and $R_{11}$, $R_{12}$, $R_{13}$ and $R_{14}$ are individually of the same significance as $R_3$; and

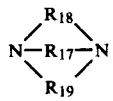

(C)

wherein $R_{17}$, $R_{18}$ and $R_{19}$ are individually selected from the group consisting of alkyl groups containing from two to six carbon atoms, inclusive.

DETAILED DESCRIPTION OF THE INVENTION

In accordance with the present invention there is provided a novel method for producing a polyurethane foam employing as the catalyst a novel amine catalyst mixture. The amine catalyst mixture requires as one of its components from about 10 to about 95 percent by weight of 2-diisopropylamino ethanol, an preferably from about 30 to about 80 percent by weight of 2-diisopropylamino ethanol.

2-Diisopropylamine ethanol is widely reported in the literature and may be prepared by any of several conventional methods. U.S. Pat. Nos. 3,417,043; 3,914,254; and 4,004,025 all set forth various syntheses.

The amines which are mixed with the 2-diisopropylamino ethanol are conventionally known in the art and may be prepared by any of several methods. Materials of generic formula A may be prepared by (1) addition of an appropriate alkylene oxide to an amine, (2) treatment of an intermediate alkanol-amine with an alkylene chlorohydrin, (3) reaction of an alkylene halohydrin with an alkylene oxide followed by a further reaction with an amine or (4) reaction of an appropriate sodium salt with a desired halogen containing material (a modification of the Williamson synthesis) to name but a few. For further information on the preparation of these amines reference is made to Arzneimittel-Forsch, 14, 1053 (1964); Bull. Soc. Chim, 41,1046 (1927); Japanese Pat. No. 7,203,809, Journal Organic Chemistry, 23, 613 (1958) and U.S. Pat. Nos. 2,525,693 and 2,439,359.

Typical examples of suitable amines of generic formula A for use with 2-diisopropylamino ethanol include, but are not limited to:

2-(2-dimethylaminoethoxy) ethanol;
2-(2-N-methyl, N-2-hydroxyethylaminoethoxy) ethanol;
2-(2-Diethylaminoethoxy) ethanol;
2-[2-(4-Morpholino)ethoxy]ethanol;
1-(2-Dimethylaminoethoxy)-2-propanol;
1-(2-Diethylaminoethoxy)-2-propanol;
1-[2-(4-Morpholino)ethoxy]-2-propanol;
1-(1-Dimethylamino-2-propoxy)-2-propanol;
1-(1-Diethylamino-2-propoxy)-2-propanol;
2-(1-Dimethylamino-2-propoxy)ethanol;
2-(1-Diethylamino-2-propoxy)ethanol; and
2-(2-diisopropylamino)ethoxy ethanol.

Materials of generic formulae (B) and (C) may be prepared by conventional methods known to the art; see, for example Can.J.Chemo., 36, 189 (1958) or U.S. Pat. No. 3,281,423.

Typical examples of suitable amines of generic formula B for use with 2-diisopropylamino ethanol include, but are not limited to, bis-(2-dimethylamino)ethyl ether; bis-(2-dibutylamine)ethyl ether; bis-(2-diisopropylamino)ethyl ether; and bis-(2-diethylamino)ethyl ether. The preferred amine of generic formula B being bis-(2-dimethylamino)ethyl ether.

Typical examples of suitable amines of generic formula C and for use with 2-diisopropylamino ethanol include, but are not limited to, 1,4-diazo-bicyclo[2.2.2]octane, 1,5-diazo-bicyclo[3.2.3]dicane, and 1,6-diazo-bicyclo[4.4.4]tetradecane.

The catalyst mixture of the present invention should contain from about 10 to about 95 percent by weight of 2-diisopropylamino ethanol and about 5 to 90 percent by weight of an amine selected from generic group A, B or C. More preferably the catalyst mixture should contain from about 30 to 80 percent by weight of diisopropylamino ethanol. The preferred amine from generic groups A,B and C is bis-(2-dimethylamino)ethyl ether. Additionally to the catalyst mixture a solubilizing additive, such as ethylene oxide, may be added.

In producing cellular urethane polymers in accordance with the teachings of this invention, the reaction mixture or foam formulation contains, in addition to the catalyst mixture, an organic polyisocyanate and an active hydrogen-containing organic compound having an average of at least two and usually not more than eight active hydrogen atoms present as hydroxyl groups. Such organic polyol reactants include compounds consisting of carbon, hydrogen and oxygen as well as compounds which contain these elements in combination with phosphorus, halogen and/or nitrogen. Suitable classes of organic polyol reactants for use in the method of this invention are polyether polyols, polyester polyols, polylactone polyols, notrogen-containing polyols, phosphorus-containing polyols, phenolic-based polyols, and polymer/polyols produced by polymerizing and ethylenically unsaturated monomer in one of the aforesaid polyols in the presence of a free radical initiator.

It is well known to the polyurethane art that the particular polyol reactant or combination of polyols employed depends upon the end-use of the polyurethane product which in turn determines whether the product is to be provided as a flexible, semi-flexible or riged material. For this purpose, the polyol reactant is usually characterized by its hydroxyl number which is determined by and defined as the number of milligrams of potassium hydroxide required for the complete neutralization of the hydrolysis product of the fully acetylated derivative prepared from 1 gram of polyol or mixture of polyols. The hydroxyl number is also defined by the following equation which reflects its relationship with the functionality and molecular weight of the polyol reactant.

$$OH = \frac{56.1 \times 1000 \times F}{MW}$$

wherein OH=hydrozyl number of the polyol; f=average functionality, that is average number of hydroxyl groups per molecule of polyol; and M.W.=average molecular weight of the polyol.

The catalyst mixture is to be added is a catalytically effective amount. Thus, the total concentration thereof may vary over a relatively wide range, such as from about 0.01 to about 10 or more parts by weight per 100 parts by weight of total polyol reactant (p.p.h.p.). Usually, this catalytic component is present in an amount from about 0.05 to about 6 p.p.h.p., preferably from about 0.1 to 6. p.h.p. In flexible foam formulations it is usually adequate to employ the catalysts in an amount up to about 3 p.p.h.p. whereas in rigid formulations higher concentrations are needed. The catalyst mixture described herein are suitably employed as catalytic components of foam formulations containing polyols having hydroxyl numbers from about 20 to about 1000. In producing flexible foams, polyols having relatively low hydroxyl numbers such as from about 20 to about 100 are generally employed. In producing semi-flexible materials, the hydroxyl number is usually from about 100 to about 300. Polyols having relatively high hydroxyl numbers of from about 300 to about 1000 are used in rigid foam formulations.

Suitable polyethers that can be employed include linear and branched polyethers preferably having a plurality of ether linkages and containing at least two hydroxyl groups and being substantially free from functional groups other than hydroxyl. For convenience, this class of polyether polyols are referred to herein as Polyol I. These compounds include alkylene oxide adducts of water such as polyethylene glycols having average molecular weights from about 200 to about 600, polypropylene glycols having average molecular weights from about 400 to about 2000, and polyoxyalkylene polyols having a combination of difference alkylene oxide units. Other suitable polyols encompassed within the definition of Polyol I are the alkylene oxide adducts of polyhydric organic initiators, the nature of which determines the average hydroxyl functionality of the polyocyalkylated product. Illustrative of suitable polyhydric organic initiators are the following which can be employed individually or in combination with one another; (1) diols such as ethylene glycol, diethylene glycol, propylene glycol, 1,5-pentanediol, hexylene glycol, dipropylene glycol, trimethylene glycol, 1,2-cyclohexanediol, 3-cyclohexene, 1,1-dimethanol and 3,4-dibromocyclohexane-1,1-dimethanol; (2) triols such as glycerol, 1,2,6-hexanetriol, 1,1,1-trimethylolothane, 1,1,1-trimethylolpropane, 3-(2-hydroxyethoxy)- and 3-(2-hydroxypropoyc)-1,2-propanediols, 2,4-dimethyl-2-(2-hydroxyethoxy)-methyl-pentanediol-1,5,1,1,1-tris[(2-hydroxyethoxy)-methyl]ethane and 1,1,1-tris[(2-hydroxypropoxy)-methyl]propane; (3) tetrols such as pentaerythritol; (4) pentols, hexols, hoptanols and octanols such as glucose, sobritol, bis(2,2,2-trimethylol)ethyl ether, alph-methyl glucoside, sucrose mannose and galactose; (5) compounds in which hydroxyl groups are bonded to an aromatic nucleus such as resorcinol, pyrogallol, phloroglucinol, di, tri- and tetraphenylol compounds such as bis(p-hydroxyphenyl)methane and 2,2-bis(p-hydroxyphenyl)-propane; and (6) alkylene oxide adducts of the aforesaid initiators such as propylene or ethylene oxide adducts of glycerol having a relatively low average molecular weight up to about 650. Particularly useful in the preparation of flexible foams generally are polyether polyols having an average hydroxyl functionality of from about 2.1 to about 4. Such polyols are provided by the employment of either trihydric or tetrahydric starters, mixtures thereof, or appropriate mixtures containing diol starters. The more highly functional polyether polyols are usually employed in providing the semi-flexible and rigid foams.

The above-described polyether polyols are normally liquid materials and, in general, are prepared in accordance with well known techniques comprising the reaction of the polyhydric starter and an alkylene oxide in the presence of an oxyalkylation catalyst. Usually, the catalyst is an alkali metal hydroxide such as, in particular, potassium hydroxide. The oxyalkylation of the polyhydric initiator is carried out at temperatures ranging from about 90° C. to about 150° C., and usually at an elevated pressure up to about 200 p.s.i.g., employing a sufficient amount of alkylene oxide and adequate reaction time to obtain a polyol of desired molecular weight which is conveniently followed during the course of the reaction by standard hydroxyl number determinations, as defined above. The alkylene oxides most commonly employed in providing the reactants encompassed by Polyol I, are the lower alkylene oxides, that is compounds having from 2 to 4 carbon atoms including ethylene oxide, propylene oxide, butylene oxides (1,2- or 2,3-) and combinations thereof. When more than one type of oxyalkylene unit is desired in the polyol product, the alkylene oxide reactants may be fed to the reaction system sequentially to provide polyoxyalkylene chains containing respective blocks of differency oxyalkylene units or they may be fed simultaniously to provide substantially random distribution of units. Alternatively, the polyoxyalkylene chains may consist essentially of one type of oxyalkylene unit such as oxypropylene capped with oxyethylene units.

A second class of polyols that are suitable for use in preparing polyurethane foams in accordance with the present invention are polymer/polyols which, for convenience, are referred to herein as Polyol II. Such reactants are produced by polymerizing one or more ethylenically unsaturated monomers dissolved or dispersed in any of the other types of organic polyol reactants described herein, in the presence of a free radical catalyst. Especially suitable as the substrate polyols for producing such compositions are any of the above-described polyether polyols encompassed by the definition of Polyol I. Typical examples of such polymerizable monomers are the following which may be employed individually or in combination: ethylene, propylene, acrylonitrile, methacrylonitrile, vinyl chloride, vinylidene chloride, styrene, alpha-methylstyrene, methyl methacrylate, and butadiene. These and other polymer/polyol compositions which are suitably employed either individually or in combination with Polyol I are those described in British Pat. No. 1,063,222 and U.S. Pat. Nos. 3,304,273, 3,523,093 and 3,383,351, the disclosures of which are incorporated herein by reference. Such compositions are prepared by polymerizing the monomers in the polyol at a temperature between about 40° C. and about 150° C. employing any free radical-generating initiator including peroxides, persulfates, percarbonates, perborates and azo compounds. Illustrative of suitable initiators are: hydrogen peroxide, dibenzoyl peroxide, benzoyl hydroperoxide, lauroyl peroxide and azobis(isobutyronitrile).

The polymer/polyol compositions usually contain from about 5 to about 50, and more usually from about 10 to about 40, weight percent of the vinyl monomer or monomers polymerized in the polyol. Especially effective polymer/polyols are those having the following composition:

A from about 10 to about 30 weight percent of a copolymer of (1) acrylonitrile or methacrylonitrile, and (2) styrene or alpha=-methylstyrene, the said copolymer containing from about 50 to 75 and from about 50 to 25 weight percent of monomeric units of (1) and (2), respectively; and B from about 90 to about 70 weight percent of one or more of the polyols encompassed by Polyol I as themedium in which said component (A) is polymerized, the trifunctional polyols such as alkylene oxide adducts of glycerol being especially suitable. These polymer/polyol compositions containing components (A) and (B) are the subject of copending U.S. application Ser. No. 176,371, filed Aug. 30, 1971, in the name of David C. Priest, and now abandoned.

Other types of suitable polyol reactants for use in producing cellular polyurethanes as described herein are polyester polyols containing an average of at least two hydroxyl groups per molecule (as alcoholic OH or as OH in —COOH groups). As is known to the art such polyester polyols are provided as the reaction products of: (1) a polyfunctional organic carboxylic acid, and (2) one or more of the aforesaid polyether polyols such as those encompassed by the definition of Polyol I, or one or more of the aforesaid polyhydric organic initiators which are reacted with alkylene oxide to produce such polyether polyols, such as, for example, diethylene glycol, glycerol and, 1,1,1-trimethylolpropane. Among the suitable polycarboxylic acids that can be employed in producting said polyester polyols are: the aliphatic acids which are usually free of reactive unsaturation such as ethylenic and acetylenic groups, such as, for example, succinic, adipic, sebacic, azelaic, glutaric, pimelic, malonic and suberic acids; cycloaliphatic acids such as chlorendic acid; and aromatic polybasic acids such as phthalic, terephthalic, isophthalic acids and the like. Other polycarboxylic acids that can be employed are the "dimer acids" such as the dimer of linoleic acid. Hydroxyl-containing monocarboxylic acids (such as ricinoleic acid) can also be used. Alternatively, the anhydrides of any of these various acids can be employed in producing the polyester polyols.

Also contemplated for use as a polyol reactant of the foam formulations employed in the practice of this invention are nitrogen-containing polyols. Such polyols include lower alkylene oxide adducts of the following amines which may be employed individually or in combination; primary and secondary polyamines such as ethylenediamine, diethylenetriamine and toluenediamine; and amino-alkanols such as ethanolamine, diethanolamine, triethanol-amine and triisopropanolamine. Also suitable are mixed starters containing one or more of the aforesaid polyfunctional amines, aniline, and/or one or more of the polyhydric initiators employed to produce Polyol I such as dipropylene glycol, glycerol and sucrose. Also illustrative of suitable nitrogen-containing polyols are aniline/formaldehyde and aniline/phenol/formaldehyde condensation products. Such amine-based polyols are usually employed in rigid foam formulations.

Other suitable polyols for use in producing polyurethane foams as described herein are: lactone-based polyols prepared by reacting a lactone such as epsilon-caprolactone, or a mixture of epsilon-caprolactone and an alkylene oxide, with a polyfunctional initiator such as a polyhydric alcohol, an amine, or an aminoalcohol; phosphorus-containing polyols such as the alkylene oxide adducts of phosphoric acid, polyphosphoric acids such as tri- and tetra-phosphoric acids, organo-substituted phosphoric acids such as benzenephosphoric acid; and other polyol reactants known to the polyurethane art.

The catalyst mixtures described herein are used with particular advantage as catalysts in the manufacture of high-resiliency of from about 55 to about 70 percent, as measured by standard test procedure ASTM D-1564-69. In accordance with a preferred embodiment of this aspect of the present invention, the catalyst mixtures are employed as catalytic components of high-resilience foam formulations wherein at least 40 weight percent of the total polyol content is constituted of a polyether triol having the following additional characteristics; (a) an average primary hydroxyl content of at least 40 mole percent (or no more than 60 mole percent of the less reactive secondary hydroxyl groups); and (b) an average molecular weight of from about 2000 to about 8000. For convenience, this particular class of polyols are referred to herein as Polyol 1-A. Preferably, such polyether triols for use as components of high-resilience formulations contain from about 60 to about 90 mole percent of primary hydroxyl groups and have an average molecular weight of from about 4,000 to about 7,000. Consistent with their tri-functionality and the aforesaid respective ranges of molecular weight, such polyether triols have hydroxyl numbers from 84 to 21, preferably from 42 to 24. These highly reactive polyether triols are provided by oxyalkylation of one of the aforesaid trihydric starters such as glycerol, with propylene oxide and ethylene oxide. Usually, the total ethylene oxide content of the polyether triols encompassed by the definition of Polyol I-A is between about 7 and about 20 weight percent, expressed on the basis of total alkylene oxide fed during the oxyalkylation reaction. The high primary hydroxyl content is introduced by capping of the polyoxyalkylene chains with at least a portion of the total ethylene oxide feed.

In providing high-resilience foams, the poly-ether triols included within the definition of Polyol I-A may be used as essentially the sole type of polyol in the formulation or they may be employed in combination with other polyols to control the degree of softness or firmness of the foam and to vary the load-bearing properties. For example, when softer grade high-resilience foams are desired, Polyol I-A may be used in combination with polyether diols such as the above-described lower alkylene oxide adducts of a dihydric initiator such as dipropylene glycol. When firm grade of high-resilience foams having enhanced load-bearing properties are desired Polyol I-A is used in combination with up to about 60 parts by weight per 100 parts by weight of total polyol reactant (p.p.h.p.) of a polymer/polyol encompassed within the definition of Polyol II. In this latter respect, particularly effective mixtures of polyols are those containing:

1. from about 40 to about 80 p.p.h.p. of the polyether triols, designated hereinabove as Polyol I-A: and 2. from about 60 to about 20 p.p.h.p. of polymer/polyols, designated herein as Polyol II-A, prepared by the in situ polymerization of a monomer mixture containing from about 50 to about 75 weight percent of arylonitrile and from about 50 to about 25 weight percent of styrene, in Polyol 1-A, the said monomer mixture constituting from about 10 to about 3 weight percent of the combined weight of the monomers and Polyol 1-A.

The Polyisocyanates used in the manufacture of polyurethanes are know to the art and any such reactants are suitably employed in producing polyurethane foams in the presence of the beta-amino nitriles catalysts described herein. Among such suitable polyisocyanates are those presented by the general formula:

Q(NCO)

wherein: i has an average value of at least 2 and is usually no more than 6, and Q represents an aliphatic, cycloaliphatic or aromatic radical which can be an unsubstituted hydrocarbyl group or a hydrocarbyl group substituted for example, with halogen or alkoxy. For example Q can be an alkylene, cycloalkylene, arylene alky-substituted cycloalkylene, alkarylene or aralkylene radical including corresponding halogen-and alkoxy-substituted radicals. Typical examples of polyisolcyanates for use in preparing the polyurethanes of the invention are any of the following including mixture thereof: 1.6-hexamethylene diisocyanate, 1,4-tetramethylene diisocyanate, bis(2-isocyanatoethyl)fumarate, 1-methyl-2,4-dissocyanatocyclohexane, bis(4-isocyanatophenyl)methane, phenylene diisocyanates such as 4-methoxy-1,4-phenylene- diisocyanate, 4-chloro-1,3-phenylenediisocyanate, 4-bromo-1,3-phenylenediisocyanate, 5,6-dimethyl-1,3-phenylediisocyanate, 2,4-tolylene diisocyanate,2,6- totylene diisocyanate, crude tolylene diisocyanates, 6-isopropyl-1,3-phenylenediisocyanate, durylene diisocyanate, triphenylmethane-4,4'4''-triisocyanate, and other organic polyisocyanates known to the polyurethanes art. Other suitable polyisocyanate reactants are ethylphosphonic diisocyanate and phenylphosphonic diisocyanate. Of the aforesaid types of polyisocyanates, those containing aromatic nuclei are generally preferred.

Also useful as the polyisocyanate reactant are polymeric isocyanates the polyphenylmethylene polyisocyanates produced by phosgenation of the polyamine obtained by acid-catalyzed condensation of aniline with formaldehyde. Polyphenylmethylene polyisocyanates of this type are available commercially under such trade names as PAPI, NIAX Isocyanate AFPI, Mondur MR, Isonate 390P, NCO-120, Thanate P-220, NCO-10 and NCO-20. These products are low in viscosity (50–500 centipoises at 25° C.) liquids having average isocyanato functionalities in the range of about 2.25 to about 3.2 or higher, and free —NCO contents of from about 25 to about 35 weight percent, depending upon the specific aniline-to-formaldehyde molar ratio used in the polyamine preparation.

Also useful as polyisocyanate reactants are polymeric tolylene diisocyanates obtained a residues from the manufacture of the diisocyanates and having a free —NCO content of from about 30 to 50 weight percent. Other useful polyiscyanate reactants are combination of diisocyanates with polymeric isocyanates containing more than two isocyanate groups per molecule. Illustrative of such combinations are: mixture of 2,4-tolylene diisocyanate, 2.6,-tolylene diisocyanate and the aforesaid polyphenylmethylene polyisocyanates and/or the aforementioned residue products.

Of the aforesaid polyisocyanates, those employed with particular advantage in providing high-resilience foams are mixtures containing from about 60 to about 90 weight percent of the isomeric tolylene diisocyanates and from about 40 to about 10 weight percent of the polyphenylmethylene polyisocyanates in order to enhance the average —NCO functionality and thus the reactivity of the reaction mixture. When the high-resilience formulations contain diisocyanates as essentially the sole source of reative —NCO, it is often desirable to include minor amounts, such as up to about 1.5 p.p.h.p., of cross-linking agents. Suitable additives for this purposes are diethanolamine, methyldiethanolamine and triethanolamine.

On a combined basis, the polyol reactant and organic polyisocyanate usually constitute the major proportion by weight of the polyurethane-forming reaction mixture. In general, the polyisocyanate and polyol reactants are employed in relative amounts such that the ratio of total —NCO equivalents to total active hydrogen equivalent (of the polyol and any water, when used) is from 0.8 to 1.5, usually from 0.9 to 1.20, equivalents of —NCO per equivalent of active hydrogen. This ratio is known as the Isocyanate Index and is often also expressed as a percent of the stoichiometric amount of polyisocyanate required to react with total active hydrogen. When expressed as a percent, the Isocyanate Index may be from 80 to 150, and is usually within the range of from about 90 to about 120. More usually, the Isocyanate Index is no more than about 115. It is to be understood that the catalyst employed in accordance with the present invention, may be introduced to the foam formulations in undiluted form or as solutions in suitable carrier solvents such as diethylene glycol, dipropylene glycol and hexylene glycol. Other useful carrier solvents are lower alkylene oxide adducts of monohydric or polyhydric starters such as butanol, dipropylene glycol and glycerol. Such solvents (or diluents) generally include adducts containing from about 3 to about 30 oxyethylene or oxypropylene units mixtures of such adducts, as well as adducts provided by reaction of the starter with ethylene oxide and propylene oxide, fed either as a mixed feed or sequentially. Among the suitable organic carrier solvents of this type are the ethylene oxide-propylene oxide adducts of butanol having the average formula, $$C_4H_9(OC_3H_6)_u(OC_2H_4)_sOH,$$

wherein s and u may each have an average value from about 1 to about 30. Preferably, the values of s and u are such that the average molecular weight of these fluids is not substantially greater than about 2000 and the oxyethylene content is from about 20 to about 80 weight percent, based on total polyoxyalkylene content. Usually, the weight percent of oxyethylene is about the same as the weight percent of oxypropylene.

Also included within the scope of the present invention is the use of the catalysts in combination with water soluble, non ionic surfactants of the class consisting of: (1) polyoxyalkylene ethers of higher alcohols having from 10 to 18 carbon atoms including mixtures hereof: and (2) polyoxyalkylene ethers of alkylsubstituted phenols in which the alkyl group can have from 6 to 15 carbon atoms. The length of the ether chain is such that appropriate hydrophilic character is provided to balance the hydrophobic portion derived from the alcohol or phenol and render the compound miscible with water. The chain may contain oxyethylene units either as essentially the sole type of unit or oxyethylene monomeric units. Usually the average number of such —OC$_2$H$_4$— units ranges from about 4 to about 20, although upwards of 30 such unite can also be present.

Typical examples of non ionic surfactants which can be used in combination with the catalysts employed in the practice of this invention are the adducts produced by reaction of from about 4 to about 30 moles of ethylene oxide per mole of any of the following hydrophobes including mixtures thereof: n-undecyl alcohol, myristyl alcohol, lauryl alcohol, trimethyl nonanol, tri-decyl alcohol, pentadecyl alcohol, cetyl alcohol, oleyl alcohol, stearyl alcohol, nonylphenol, dodecylphenol, tetradecylphenol, and the like. Especially suitable are the ethylene oxide adducts of nonylphenol having the average composition,

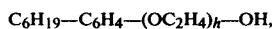

$$C_6H_{19}-C_6H_4-(OC_2H_4)_h-OH,$$

wherein h has an average value from about 4 to about 20, inclusive of the whole and fractional numbers, such as 6, 9, 10.5 and 15.

The above-described solution compositions may contain from about 10 to about 90 weight percent of total catalyst based on the combined weight of catalyst, solvent and/or non ionic surfactant, depending upon whether the catalyst is employed in combination with either one or both of the solvent and non ionic surfactant.

In producing polyether polyol-based polyurethanes including the above-described polymer polyols, it is often desirable to include as a further component of the foam formulation a minor amount of certain metal catalysts, particularly organic derivatives of tin including stannous and stannic compounds. Such metal cocatalysts are qell known to the art. Illustrative of suitable organic tin compounds are the following which may be employed individually or in combination: stannous salts of carboxylic acids such as stannous octoate, stannous oleate, stannous acetate and stannous laurate; dialkyltin dicarboxylates such as dibutyltin dilaurate, dibutyltin diacetate, dilauryltin diacetate, dibutyltin di(2-ethylhexanoate) and other such tin salts as well as dialkyltin oxides, trialkyltin oxides, tin mercaptides such as, for example, di-n-octyl tin mercaptide, and the like. When used, the amount of such metal co-catalysts ranges from about 0.001 to about 2 parts by weight per 100 parts by weight of total polyol reactant. In flexible foam formulations, the metal co-catalyst is preferably used in an amount from about 0.01 to about 0.6 p.p.h.p. and most preferably in an amount no more than about 0.5 p.p.h.p..

Foaming is accomplished by the presence in the reaction mixture of varying amounts of a polyurethane blowing agent such as water which, upon reaction with isocyanate, generates carbon dioxide in situ, or through the use of blowing agents which are vaporized by the exotherm of the reaction, or by a combination of the two methods. These various methods are known in the art. Thus, in addition to or in place of water, other blowing agents which can be employed in the process of this invention include methylene chloride, liquefied gases which have boiling points below 80° F. and above −60° F., or other inert gases such as nitrogen, carbon dioxide added as such, methane, helium and argon. Suitable liquefied gases include aliphatic and cycloaliphatic fluorocarbons which vaporize at or below the temperature of the foaming mass. Such gases are at least partially fluorinated and may also be otherwise halogenated. Fluorocarbon agents suitable for use in foaming formulations of this invention include: trichloromonofluoromethane; dichlorodifluoromethane; 1,1-dichloro-1-fluoroethant; 1,2,2,-tri-fluoro-1,1,2-trichloroethane; 1,1,1-tri-fluoro-2-fluoro-3,3-difluoro-4,4,4,-tri-fluorobutane; hexafluorocyclobutene; and octafluorocyclobutane. Another useful class of blowing agents include thermally-unstable compounds which liberate gases upon heating, such as N,N'-dimethyl-N,N'-dinitrosoterephthalamide, and the like.

Generally, the blowing agent is employed in an amount from about 1 to about 45 parts by weight per 100 parts by weight of total polyol reactant, the particular blowing agent and amount thereof depending upon the type of foam product desired. Flexible foam formulations including those which favor formation of high-resilience foam, are most usually water blow, although a minor proportion such as up to about 10 weight percent of total blowing agent may be constituted of a fluorocarbon such as trichlorofluoromethane. Flexible foam formulations usually contain no more than about 10 p.p.h.p. of water. For rigid formulations, blowing action is usually supplied employing a fluorocarbon in a relatively high proportion such as from about 10 to about 45 p.p.h.p., either as the sole type of agent of in combination with a minor amount of water such as up to about 10 weight percent of total blowing agent. The selection and amount of blowing agent in any particular foam formulation is well within the skill of the cellular polyurethane art.

In producting cellular polyurethanes in accordance with the method of this invention, a minor amount of an organosilicone surfactant may also be present as an additional component of the polyurethant-forming reaction mixture. When used, such surfactants are usually present in amounts up to about 5 parts by weight per 100 parts by weight of total polyol reactant.

Suitable classes of silicone surfactants are the polysiolxane-polyoxyalkylene block copolymers wherein the respective blocks are joined through silicon-to-carbon or silicon-to-oxygen-to-carbon bonds and the respective polyoxyalkylene blocks are bonded to difference silicon atoms of the polysiloxane backbone to form a comb-like structure. Usually, the polysiloxane blocks are trialkysiloxy-endblocked. In addition to the siloxy units to which the pendant polyoxyalkylene chains are bonded, the polysiloxane backbone is formed of difunctional siloxy units wherein the respective two remaining valances of silicon are satisfied by bonds to organic radicals. Illustrative of such organic radicals are the hydrocarbyl groups having from 1 to 12 carbon atoms including alkyl, aryl, aralkyl, bicycloheptyl and halogen substituted derivative of such groups. The polyoxyalkylene blocks are usually constituted of oxyethylene units, oxypropylene units or a combination of such units, and the polyoxyalkylene chains are hydroxyl-terminated or capped with a monovalent organic group such as alkyl, aryl, aralkyl, acyl, carbamyl and the like. Especially useful as stabilizers of flexible polyether-based polyurethane foams are the block co-polymers described in U.S. Pat. No. 3,505,377, an application for reissue of which was filed on Nov. 18, 1971 as Ser. No. 200,242 of Edward L. Morehouse, now Reissue Pat. No. 27,541. The copolymers of the latter patent contain from 40 to 200 dimethylsiloxy units as essentially the sole type of difunctional unit and from 15 to 60 weight percent of the oxyalkylene content of the polyoxyalkylene blocks is constituted oxyethylene. Also useful as stabilizers of flexible, polyether-based polyurethane foam including flame-retarded foam, are the block copolymers described in U.S. Pat. No. 3,657,305. The polysiloxane backbone of the organo-silicones of the latter patent, contains an average of from 10 to 200 dimethylsiloxy unites in combination with from 1 to 50 methyl-aralkyl-siloxy units such as, in particular, methyl-phenylethyl-siloxy units. Other useful foam stabilizers for flexible polyether-based foam are the block co-polymers described in U.S. Pat. No. 3,686,254.

A second type of foam-stabilizing component which can be present in the formulations described herein are the branched block copolymers described in U.S. Pat. No. 2,834,748. Organosilicone foam stabilizers described in the latter patent include those containing a tri-functional siloxy unit to which three polyoxyalkylene blocks are bonded through dialykyl-substituted siloxy units.

Particularly useful as foam-stabilizing components of flame-retarded flexible polyurethane formulations in general are block copolymers wherein the polysiloxane blocks are trialkylsiloxy-endblocked and contain reoccureing di-functional dialkylsiloxy monomeric units in combination with reoccuring difuntional cyanoalkylalkylsiloxy or cyano-alkoxy-alkylsiloxy monomeric units, the mole ratio of the dialkylsiloxy units to the cyano-substituted siloxy units being about 10-200-:3-100, and wherein the polysiloxane and polyoxyalkylene blocks are joined through an Si-C or an Si-O-C linkage, and from about 20 to about 65 weight percent of the oxyalkylene content of the polyoxyalkylene blocks is constituted of oxyethylene units. The block copolymers are described and claimed in copending application Ser. No. 279,883, filed Aug. 11, 1972, in the names of Bela Prokai and Bernard Kanner, now U.S. Pat. No. 3,846,462.

Because of the high reactivity of high-resilience foam formulations, the foams are generally self-stabilizing and can be obtained without the use of stabilizing agents. However, it is usually desirable to include a silicone surfactant as an additional component of such formulations in order to minimize the tendency of the foam to settle and to control cell uniformity. Particularly effective for this purpose are the relatively low molecular weight polyoxyalkylene-polysiloxane block copolymers described and claimed in copending application Ser. No. 84,181, filed Oct. 26, 1980, of Edward L. Morehouse, now U.S. Pat. No. 3,741,917.

Also suitable as organosilicone components of high-resilience foam formulations are the relatively low molecular weight aralkyl-modified polymethylsiloxane oils described and claimed in copending application Ser. No. 305,713, filed No. 13, 1972, in the name of Edward L. Morehouse, and entitled "Polyether Urethane Foam," now U.S. Pat. No. 3,839,384.

When used, the organosilicone component is usually present in high-resilience foam formulations in an amount between about 0.025 and about 2 parts by weight per 100 parts by weight of total polyol reactant.

Illustrative of suitable surfactant components of rigid foam formulations are copolymers wherein the polyoxyalkylene blocks are hydroxyl-terminated such as those described in U.S. Pat. No. 3,600,418.

With respect to formation of flexible polyester polyol based polyurethanes, suitable, silicon-containing foam stabilizers include the polysiloxane-polyoxyalkylene block copolymers described, for example, in U.S. Pat. Nos. 3,563,924 and 3,594,334. Such copolymers include those characterized by a particular molecular weight (600-17000), siloxane content (14–40 weight percent based on the weight of the copolymer) and oxyethylene content (at least 75 weight percent based on the total amount of oxyalkylene groups in the copolymer). These organosilicones are usually employed in combination with an anionic, silicon-free organic emulsifier such as those described in said U.S. Pat. No. 3,594,334 the teachings of which are incorporated herein by reference. Also effective as stabilizers of polyester-based foams are the organosilicones containing tetrafunctional $SiO_{4/2}$ units described and claimed in U.S. Pat. No. 3,793,360.

The catalysts described herein are also effective catalytic components of flame-retarded foam formulations. The flame-retardants can be chemically combined on one or more of the other materials used (e.g., in the polyol or polyisocyanate), or they can be used as discrete chemical compounds added as such to the foam formulation. The organic flame-retardants preferably contain phosphorus or halogen, or both phosphorus and halogen. Usually, the halogen, when present, it chlorine and/or bromine. Flameretardants of the discrete chemical variety include: 2,2bis(-bromoethyl)-1,3-propanediol; 2,3-dibromopropanol; tetrabromophthalic anhydrice; brominated phthalate ester diols such as those produced from tetrabromophthalic anhydride, propylene oxide and propylene glycol; tetrabromobisphenol-A; 2,4,6-tribromophenol; pentabromophenol; brominated anilines and dianilines; bis(2,3-dibromopropyl)ether of sorbitol; tetrachlorophthalic anhydride, chlorendate; chlorinated maleic anhydride; tris(2-chloroethyl)phosphate $[(ClCH_2Ch_2O)_3-P(O)]$; tris(2,3-dibromopropyl)phosphate; tris(1,3-dichloropropyl)-phosphate; tris(1-bromo-3-chloroisopropyl)phosphate; tris(1,3-dichloroisopropyl)phosphate; bis(2,3-dibromopropyl) phosphoric acid or salts thereof; oxypropylated phosphoric and polyphosphoric acids; polyol phosphites such as tris(dipropylene glycol)phosphite; polyol phosphonates such as bis(di-propylene glycol)hydroxymethyl phosphonate; di-poly(oxyethylene)-hydroxymethyl phosphonate; di-poly(oxypropylene-phenyl phosphonate; di-poly(oxypropylene)chloromethyl phosphonate; di-poly(oxypropylene)butyl phosphonate and O,O-diethyl-N,N-bis(2-hydroxyethyl)-aminomethyl phosphonate. Other suitable flame-retardants comprise halogen-containing polymeric resins such a polyvinylchloride resins in combination with antimony trioxide and/or other inorganic metal oxides such as zinc oxide, as described in U.S. Pat. Nos. 3,075,927; 3,075,928; 3,222,305; and 3,574,149. It is to be understood that other flame-retardants known to the art may be used and that the aforesaid compounds may be employed individually or in combination with one another.

When used, the flame-retarding agent can be present in the foam formulations described herein in an amount from about 1 to about 30 parts by weight per 100 parts by weight of the polyol reactant, the particular amount employed depending largely on the efficiency of any given agent in reducing flammability.

If desired, other additional ingredients can be employed in minor amounts in producing the polyurethane foams in accordance with the process of this invention. Illustrative of such additives that can be employed are: cross-linking agents such as glycerol, diethanolamine, triethanolamine and their oxyalklene adducts; additives to enhance loadbearing properties such as methylene-di-orthchloroaniline (MOCA); as well as fillers, dyes, pagments, anti-discoloration additives including anti-scorch and anti-oxidation agents, and the like.

With respect to the aforementioned anti-discoloration additives it is noted that, in the commercial manufacture of polyurethane slabstock, discoloration due to scroching may be observed in or toward the center sections of the bun where the heat due to the exotherm of the polyurethane forming reaction is more intense and held longer. The discoloration becomes more evident as the size of the foam bun increases and is especially noticeable when the bun is cut into relatively thin sections as in the application of polyester polyol-derived foam as a textile interliner. In general, such discoloration is inhibited by the addition to the formulation of minor amounts of various anti-scorch additives such as: phenols substituted with tertiarybutyl groups such as 2,6-di-tertbutyl-4-methylphenol ("lonol"), and 2,4,6-tri-tertbutyl-phenol, tert-butylcatechol; p-methoxyphenol; phenothiazine; oxirane-containing compounds such as, in particular, propylene oxide, triorgano-substituted phosphites and phosphines such as, for example, triphenylphosphite and triphenylphosphine; and other known anti-scorch or anti-oxidizing agents including any combination of the aforesaid compounds. When used, such additives are present in the foam formulation in an amount between about 0.005 to about 1 part by weight, per 100 parts by weight of the catalyst, and are usually added in combination with the catalyst. The cellular urethane polymers of the invention may be formed in accordance with any of the processing techniques known to the polyurethane art such as the "one-shot", quasi-pre-polymer and prepolymer techniques. For example, in accordance with the "one-shot" process, foamed products are produced by carrying out the reaction of the polyisocyanate and the polyol reactants in the presence of the catalyst systems described herein, simultaneously with the foaming operation. This one-step process is usually employed in producing flexible foam including high-resilience foam, although it is also applicable to rigids. In preparing foamed products in accordance with the quasi-prepolymer technique, the polyisocyanate is first reacted with a portion of the polyol reactant to give a product having a high percentage of free-NCO groups (e.g., from 20 to 50 percent), and the product is subsequently foamed by reaction with additional polyol and foaming agent in the presence of the catalysts. In the prepolymer technique, the polyisocyanate is reacted with a slightly less than stoichiometric quantity of the polyol reactant to form a prepolymer having a low percentage (e.g., from 1 to 10 percent) of free-NCO groups, followed by reaction of the prepolymer with a blowing agent such as water in the presence of the catalyst systems described herein to form the cellular material. These various multi-stage methods are more usually applied to rigid formulation.

In general, final or post-curing of the foam products is achieved by allowing the foam to stand at ambient temperatures until a tack-free product is obtained, or by subjecting the foam to elevated temperaures up to about 500° F. in order to achieve more rapid curing. In view of the higher reactivity of the combination of reactants employed in producing high-resilience foams, however, a sufficiently high degree of curing is achieved during foam formation without the necessity of subjecting the foam to conventional high temperature (e.g., 300°-500° F.) post-curing procedures which are otherwise applied in the commercial manufacture of flexible foams from less highly reactive flexible foam formulations.

In the specific application of the catalysts described herein as catalytic components of molded, high-resilience foam formulations, and mold is charged with the foamable reaction mixture either at ambient temperature or pre-heated to a temperature of from about 70° F. to about 200° F., in an amount sufficient to at least completely fill the mold. The mold is then closed and the reaction mixture is allowed to foam and cure itself. In view of the good mold-release characteristics of the high-resilience foams produced in accordance with the present invention, the foamed product is readily removed from the mold without substantial damage to the foam surface. The demolded foam is suitable for end-use application without further curing. It is to be understood, however, that such foam may be subjected to further curing, as desired.

The end-use applications of cellular polyurethanes are well known. Thus, the polyurethane foams produced in accordance with the present invention are useful as textile interliners, cushioning material, mattresses, paddings, carpet underlay, packaging, gaskets, sealers, thermal insulators and the like.

Whereas the exact scope of the instant invention is set forth in the appended claims, the following specific examples illustrate certain aspects of the present invention, and none particularly, point out methods of evaluating the same. However, the examples are set forth for illustration only and are not to be construed as limitations on the present invention except as set forth in the appended claims. All parts and percentages are by weight unless otherwise specified.

Foam Bench Procedure

The foams are prepared as follows: the foam stabilizer, amine catalysts and water are premixed in a beaker. The polyol is weighted into a container and the isocyanate is then added and mixed with a spatula until homogeneous. Further mixing is done on a drill press equipped with a double three-bladed marine-type propellor about three inches in diameter. The mixing in the drill press is accomplished at 1000 RPM for about eight seconds. Then the premixture of foam stabilizer, amine catalysts, and water is added and mixing continued for about seven additional seconds. The reaction mixture is poured into a one foot by one foot cardboard box and allowed to cure and rise to its maximum height. The foam is then post cured for about 30 minutes at 120° C. All the foams are removed from the oven and aged for twenty-four hours at ambient temperature before being cut open and observed for properties. The results are reported below.

EXAMPLES 1–16

Following the Foam Bench Procedure set forth above in every material detail a foam formulation containing the following components is tested to determine how the catalysts employed perform. The foam formulation contains:

| Component | Parts By Weight |
| --- | --- |
| Polyester resin[1] | 100 |
| Water | 3.6 |
| Sulfated or sulfonated fatty acid ester | 1.4 |
| Diethylammonium oleate | 1.3 |
| Hexadecyldimethylamine | varied |
| Primary Amine Catalyst | varied |
| 80/20 TDI (105 Index)[2] | 45.1 |

[1]Polyester resin employed is produced from adipic acid, diethylene glycol and trimethylol propane in a mole ratio of 1:1:0.2. The resin has a hydroxyl number of about 50–56, a molecular weight of 2000, an acid number not greater than 2 and a viscosity of about 17,000 centistokes at about 25° C.
[2]This is a mixture of about 80 weight percent 2,4-tolylene diisocyanate and about 20 weight percent 2,6-tolylene diisocyanate.

The primary amine catalysts employed are as follows:
Amine I: 2-diisopropylamine ethanol (DIPAE)

[(CH$_3$)$_2$CH]$_2$—NCH$_2$CH$_2$OH

Amine II: N-ethylmorpholine (NEM)

Amine III: 1,4-diazo-bicyclo[2.2.2] octane (DABCO)

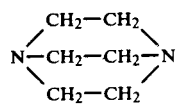

Amine IV: Bis-(2-dimethylamino)ethyl ether (BDEE)

(CH$_3$)NCH$_2$CH$_2$OCH$_2$N(CH$_3$)$_2$

Amine V: N,N-dimethylethanolamine (DMEA)

(CH$_3$)$_2$NCH$_2$CH$_2$OH

Amine VI: 2-(2-dimethylamino ethoxy)ethanol (DMEE)

(CH$_3$)$_2$NCH$_2$CH$_2$OCH$_2$CH$_2$OH

Amine VII: 20% BDEE and 80% DIPAE
Amine VIII: 10% BDEE and 90% DIPAE
Amine IX: 40% DMEA and 60% DIPAE
Amine X: 5% BDEE and 95% DIPAE
Amine XI: 20% DABCO and 80% DIPAE Also for the sake of brevity, the following designations are used to denote various processing conditions and evaluation determinations of the foams produced in the examples and are defined as indicated below.

1. Cream Time (seconds)-Denotes the time in seconds it takes for the foam-forming mixture to go from a homogeneous clear liquid to a heterogeneous milky liquid.
2. Rise Time (seconds)-Denotes the time in seconds it takes the foam to reach its maximum height.
3. Gel Time (seconds)-Denotes the time in seconds it takes a foam to reach sufficient strength to be handled.
4. Activator Solubility-Denotes the solubility of an aqueous premixture of amine catalyst and surfactant foam stabilizer.
5. Breathability-Denotes the porosity of a foam, being roughly proportional to the number of cells in the foam, and was measure in accordance with the NOPCO breathability test procedure described by R. E. Jones and G. Fesman, Journal of Cellular Plastics, January, 1965. It is a measure of the air flow through a 2"×2"×1" foam sample expressed as standard cubic feet per minute (SCFM).
6. Density (pcf)-Denotes the density of a foam in pound per cubic foot.
7. ILD (pounds per 50 square inches)-Denotes an indention rating of how much force (load in pounds per 50 square inches) is necessary to compress a foam sample at various deflections.
8. Compression Set (percent)-Denotes the degree of failure of a foam sample to return to its original size after removal of a feforming force. The permanent change in height of the foam sample is measured and the percent set calculated.
9. Tensile Strength (psi)-Denotes the force necessary to rupture a foam specimen when stretched to the breaking point divided by the original cross sectional area given in pounds per square inch.
10. Tear Resistance (pounds per inch)-Denotes the force necessary to tear a foam specimen divided by its thickness given in pounds per inch.
11. Elongation (percent)-Denotes the amount of stretch of a foam sample under a tensile force expressed as a percentage of the original length.

Test results are given in Table I.

TABLE I

EVALUATION OF AMINE BLEND IN POLYESTER FOAM FORMULATION

| FORMULATION | 1 | 2 | 3 | 4 | 5 | 6 | 7 | 8 | 9 |
|---|---|---|---|---|---|---|---|---|---|
| Polyester Resin | 100 | | | | | | | | |
| H$_2$O | 3.6 | | | | | | | | |
| Amine I | 2.0 | | | | | | | | |
| Amine II | | 2.0 | | | | | | | |
| Amine III | | | 0.5 | 0.3 | 0.4 | | | | |
| Amine IV | | | | | | 0.4 | 0.6 | 0.5 | |
| Amine V | | | | | | | | | 0.5 |
| Hexadecyldimethylamine | 0.25 | | | | | | | | |
| Sil. Surfactant[1] | 1.0 | | | | | | | | |
| TDI 80/20 - 105 index | 44.6 | | | | | | | | |
| Activator (solubility) | | clear | cloudy | cloudy | cloudy | cloudy | cloudy | cloudy | clear |
| Cream Time (sec) | 23 | 13–14 | 12–13 | 13–14 | 12–13 | 15–16 | 12 | 12 | 13 |
| Rise Time (sec) | 176 | 79 | 64 | 88 | 78 | 70 | 63 | 56 | 76 |
| Comments | top shrinkage | good foam | top shrinkage | good foam | good foam | top shrinkage | top shrinkage | top shrinkage | top shrinkage |
| Breathability (SCFM) | 1.2 | 1.2 | 1.2 | 1.3 | 1.05 | 1.7 | 1.2 | 0.8 | 1.2 |
| Cells per inch | coarse | | | | | | | | |
| Density (pcf) | 1.65 | 1.72 | 1.62 | 1.67 | 1.68 | 1.60 | 1.63 | 1.66 | 1.65 |
| Odor | none | severe | slight | slight | slight | none | none | none | slight |
| Scorch | none | none | slight | slight | slight | none | none | none | moderate |

| FORMULATION | 10 | 11 | 12 | 13 | 14 | 15 | 16 |
|---|---|---|---|---|---|---|---|
| Polyester Resin | 100 | | | | | | |
| H$_2$O | 3.6 | | | | | | |
| Amine VI | | 1.0 | | | | | |
| Amine VII | | | 2.0 | | | | |
| Amine VIII | | | | 1.8 | | | |
| Amine IX | | | | | 1.8 | | |
| Amine X | | | | | | 2.0 | |

TABLE I-continued
EVALUATION OF AMINE BLEND IN POLYESTER FOAM FORMULATION

| Amine XI | | | | | | | 1.8 |
|---|---|---|---|---|---|---|---|
| Hexadecyldimethylamine | 0.25 | | | | | | |
| Sil. Surfactant[1] | 1.0 | | | | | | |
| TDI 80/20 - 105 index | 44.6 | | | | | | |
| Activator (solubility) | cloudy | clear | | | | | clear |
| Cream Time (sec) | 12–13 | 9 | 10 | 11 | 11–12 | 11–12 | 12 |
| Rise Time (sec) | 83 | 68 | 70 | 63 | 75 | 73 | 74 |
| Comments | good foam | good foam | good foam | top shrinkage | good foam | good foam | good foam |
| Breathability (SCFM) | 1.35 | 1.75 | 1.9 | 1.6 | 1.4 | 2.5 | 1.6 |
| Cells per inch | 45–50 | 45–50 | | | | | |
| Density (pcf) | 1.60 | 1.61 | 1.63 | 1.58 | 1.61 | 1.6 | 1.71 |
| Odor | none | none | none | none | none | none | none |
| Scorch | moderate | none | none | severe | none | none | none |

[1]35% organic silicone surfactant, 35% sodium sulfonate of a petroleum hydrocarbon, 15% Tall Oil, 14 hexylene glycol, 1% 2,6-di-tertiary-butyl-p-cresol All of the catalysts of this invention produced good quality, well cured foam with desired cream/rise profiles. The control formulation contains n-ethylmorpholine (NEM, Amine II, Example II). The use of 1,4 diazo-bicyclo[2.2.2]octane (DABCO, Amine III, Example III), 2-(2-dimethylamino ethoxy) ethanol (DMEE, Amine VI, Example 10), bis-(2-dimethylamino) ethyl ether (Amine IV, Example 6, 7, 8) N,N-dimethylethanol amine (DMEA, Amine V, Example IX) greatly enhanced the reactivity of the polyester foam, however, processibility (defined as points between splits and collapse) was decreased. On the other hand, use of the other amines such as 2-diisopropylamino ethanol (DIPAE, Amine I, Example 1), did not have sufficient cream and rise time. Actually foams made with these amines had undesirable cell structures and reactivity profile (Example 1). Increased levels of this amine did not correct the problem. In a novel and unexpected result, foams prepared with mixture of Amine I and Amine 3 or 4 did produce acceptable foams with desired cell structure and reactivity profile. These mixed amines are referred to as Amine VII, VIII, X and VI (examples 11, 12, 14 15, 16).

EXAMPLES 17–21

Using the following foam producing reaction composition:

| Foam Formulation | |
|---|---|
| Component | Parts By Weight |
| Polyester Resin | 100 |
| Water | 3.7 |
| Primary Catalyst | varied |
| Sil. Surfactant[1] | 1.0 |
| Hexadecyldimethylamine | 0.2 |
| 80/20 TDI (105 index) | 105 |

[1]35% organic silicone surfactant, 35% sodium sulfonate of a petroleum hydrocarbon, 15% Tall Oil, 14% hexylene glycol, 1% 2,6-di-tertiary-butyl-p-cresol.

a series of comparative machine scale flexible polyester polyurethane foams are prepared at a throughput of about 60–70 pounds of foam per minute.

The foams are all prepared as follows: a constant stream of polyester polyol, about 15,900 grams per minute, along with an activator stream, about 940–1370 grams of preblended water, amine catalyst, and surfactant foam stabilizer, (the amount of this stream varies depending upon the composition of this stream) and a stream of polyisocyanate, about 7180 grams per minute are introduced into Hennecke UBT-63 high pressure continuous polyurethane foam machine. The mixer speed was about 5000 RPM and the head pressure is 12–17 pounds per square inch. At ambient temperature the emerging foam mixture is poured onto paper on a continuously moving conveyor belt. The foams are allowed to set and cure in the form of 12 foot long, 12 inch wide, 18 inch high slabs. After 24 hours of aging at ambient temperature the foams are cut and physical properties are determined. The results along with other physical properties of the foam are reported in Table II.

TABLE II

| Catalyst Composition wt. percent | 17 | 18 | 19 | 20 | 21 |
|---|---|---|---|---|---|
| n-ethyl morpholine | 100 | | | | |
| Bis-(2-dimethylamino)ethyl ether | — | 5.0 | 10.0 | — | — |
| | — | 47.5 | 45.0 | 50 | 40 |
| DMEE | — | — | — | 25 | 40 |
| 2-Diisopropylamino ethanol | — | 47.5 | 45.0 | 25 | 20 |
| Catalyst Use Level | 2.0 | 2.0 | 1.0 | 2.0 | 1.0 |
| Cream Time/Rise Time | 6/70 | 6/72 | 7/63 | 6/73 | 6/82 |
| Density | 1.58 | 1.50 | 1.58 | 1.57 | 1.71 |
| Breathability ft$^3$/min/ft$^2$ | 7.0 | 4.0 | 2.5 | 4.0 | 5.5 |
| ILD | 52 | 58 | 52 | 44 | 50 |
| 90 percent compression set percent | 14.9 | 10.2 | 11.8 | 12.6 | 71.6 |
| Comments: Scorch: | no | no | no | yes | yes |
| Appearance: | slight shrink | no age | no age | slight shrink | slight shrink |
| Odor | severe | none | none | none | none |

We claim:

1. A method for producing a cellular urethane polymer which comprises reacting (a) an organic polyisocyanate and (b) a polyester polyol containing at least two active hydrogen atoms, in the presence of a blowing agent and an amino catalyst mixture and foaming the product, wherein the amino catalyst mixture comprises from about 10 to 95 percent by weight of 2-diisopropylamino ethanol and from 5 to 90 weight percent of an amine or a mixture of amines selected from the group consisting of 2-(2-dimethylaminoethoxy) ethanol; bis-(2-dimethylamino) ethyl ether; and 1,4-diazo-bicyclo[2.2.2]octane.

2. The method of claim 1 in which said blowing agent is water.

3. The method of claim 1 in which said blowing agent is a combination of water and a fluorocarbon.

4. The method of claim 1 in which the isocyanato groups of said organic polyisocyanate are bonded to an aromatic nucleus.

5. The method of claim 4 in which said organic polyisocyanate is a tolylene diisocyanate.

6. The method of claim 4 in which said organic polyisocyanate is a polyphenylmethylene polyisocyanate.

7. The method of claim 4 in which said oganic polyisocyanate is a mixture of isomeric tolylene diisocyanates and polyphenylmethylene polyisocyanates.

8. A method for producing a flexible polyurethane foam which comprises reaction and foaming (a) an organic polyisocyanate (b) a polyester polyol having a hydroxyl number of from 20 to about 1000; (c) water; (d) a foam-stabilizing component and (e) the amino catalyst mixture of claim 1.

9. The method of claim 8 in which the foam-stabilizing component is a silicone-free, organic surfactant.

10. The method of claims 1 or 8 wherein the amino catalyst mixture comprises a mixture of 2-diisopropylamino ethanol and 2-(2-dimethylaminoethoxy)ethanol.

11. The method fo claims 1 or 8 wherein the amino catalyst mixture comprises a mixture of 2-diisopropylamino ethanol and bis-(2-dimethylamino)ethyl ether.

12. The method of claims 1 or 8 wherein the amino catalyst mixture comprises a mixture of 2-diisopropylamino ethanol and 1,4-diazo-bicyclo[2.2.2]octane.

13. The method of claims 1 or 8 wherein the amino catalyst mixture comprises from about 30 to 80 percent by weight of diisopropylamino ethanol.

* * * * *